P. MUELLER & A. C. SCHUERMANN.
ADJUSTABLE SCREW JOINT COUPLING FOR SUPPLY PIPES.
APPLICATION FILED MAR. 24, 1911.
1,036,684.
Patented Aug. 27, 1912.
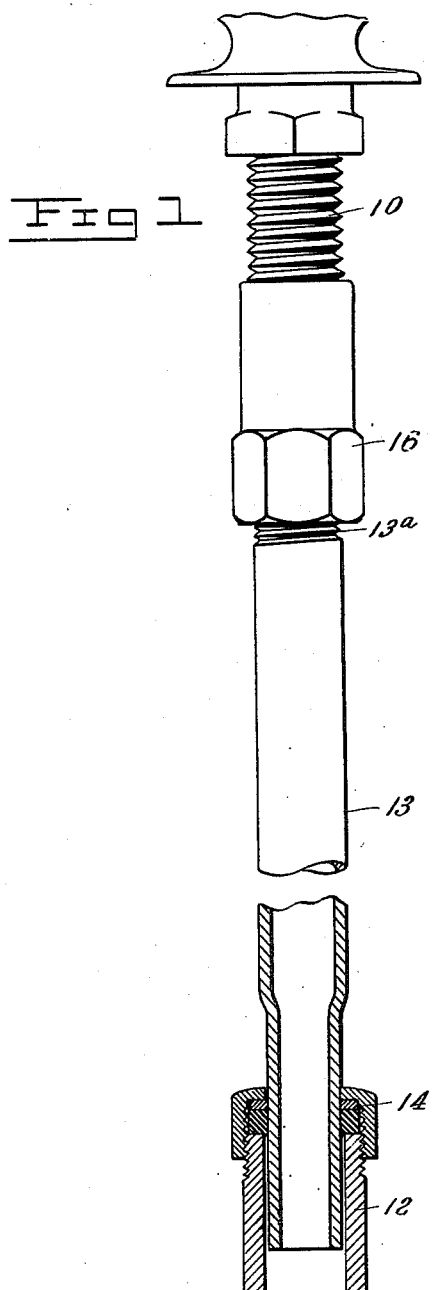
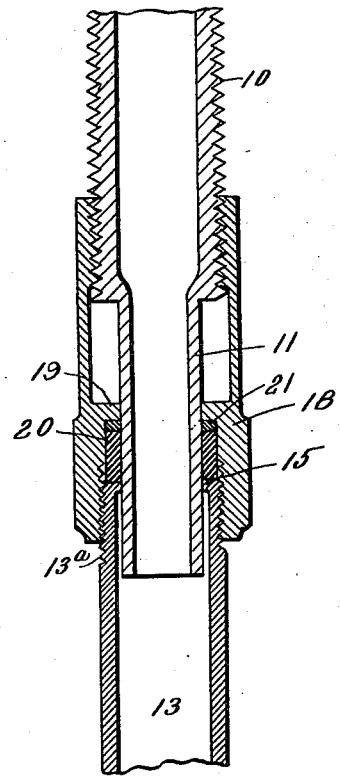
Witnesses
Inventors
Philip Mueller and
Anton C. Schuermann
By Meyers, Cushman & Rea
Attorneys

UNITED STATES PATENT OFFICE.

PHILIP MUELLER AND ANTON C. SCHUERMANN, OF DECATUR, ILLINOIS, ASSIGNORS TO H. MUELLER MANUFACTURING COMPANY, OF DECATUR, ILLINOIS, A CORPORATION OF ILLINOIS.

ADJUSTABLE SCREW-JOINT COUPLING FOR SUPPLY-PIPES.

1,036,684.　　　　　Specification of Letters Patent.　　Patented Aug. 27, 1912.

Application filed March 24, 1911. Serial No. 616,695.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Adjustable Screw-Joint Couplings for Supply-Pipes, of which the following is a specification.

This invention relates to coupling pipes such as are employed in making connection between service pipes and the faucets of bath tubs, wash basins, and the like, this connection forming what is now generally known in the art as the supply pipe, and relates more particularly to the manner in which this pipe is coupled up to the part or parts to which it is connected.

In order to permit the use of coupling pipes or the supply pipe in standard sizes as to length and diameter, especially for open plumbing work, it is found advisable to provide adjustable connections between the supply pipe and either one or both of the parts to which it is connected, this being due to the fact that the distance between the service pipe and the faucet shank, spud, or tail-piece as the case may be, varies in installation. As the supply pipe, in open plumbing work, is visible throughout substantially its length, its appearance has more or less effect upon the beauty of the plumbing, and consequently the supply pipe should be, as far as possible, symmetrical in appearance with the remaining portions of the fixtures. In view of the fact that this symmetrical appearance must be provided in the face of conditions produced by the liquid pressure, several essentials are necessary.

One of the essentials required is that the coupling shall not be liable to blow-outs, and yet at the same time provide a structure in which the internal diameter of the supply should be of sufficient size for all practical purposes while the outer diameter is such as will not provide a bulky appearance. To meet these conditions, it has been proposed to employ a slip-joint connection with the end of the supply pipe telescoping into the fitting member, the supply pipe preferably having a flange against which the coupling nut may operate to retain the connection, a packing being employed in connection with this flange. This construction, owing to the liability of blow-outs under high liquid pressure, is not entirely satisfactory, one reason being that it is difficult to provide a proper manipulation of the packing so as to insure a non-leakage of liquid.

Another feature greatly desired in supply pipes, is to provide for variations in the distance between the service pipe and the faucet or lavatory member by the use of a standard length supply pipe, making the connections such as to eliminate all liability of blow-outs, one way of meeting this latter condition being to provide for a sufficient adjustment at the ends of the supply pipe to produce the proper exposed length of the pipe and yet provide a sufficient length of unexposed portion within the coupling as will make the latter practically blow-out proof. And a preferable form of device is to provide for connecting the supply and service pipes by a slip-joint, and providing for screw threaded adjustments in the connections at the opposite end of the supply pipe. To provide this arrangement we obtain the combined effect of the use of both screw threaded and slip-joint connections, obtaining the advantages of both and in addition eliminating all of the disadvantages of both. In obtaining this result we provide for compressing the packing onto a smooth face of the coupling.

The object of our invention is, therefore, to provide a coupling pipe and connections capable of providing the essentials referred to, and the invention consists in the improved construction and combination of parts hereinafter fully described, illustrated in the accompanying drawings, and particularly pointed out in the appended claims.

In the drawings, in which similar reference characters indicate similar parts in each of the views,—Figure 1 is a view partly in elevation and partly in section of a preferred form of coupling pipe mounted in position. Fig. 2 is an enlarged longitudinal sectional view taken through the connection at the upper end of the pipe.

In the drawings, 10 designates a faucet shank exteriorly threaded and having its end in the form of an extension 11 of decreased diameter, said extension being of substantial length and having its exterior smooth. The term "shank" is simply used as indicative of a general class of fittings, it being understood that the part designated as the shank may be a portion of any type of fitting, such as the shank of a bath or basin cock, the tail-piece of a lavatory member, etc., the invention being applicable for use in connection with any of the well known types of fittings.

12 designates the service pipe, and 13 the coupling or supply pipe, the latter preferably being formed with a reduced lower end and connected to the service pipe by a slip-joint 14 of any preferred type. It is to be understood, however, that we do not limit the invention to this particular formation of the lower end of the pipe or the form of coupling, since it will be obvious that the supply pipe may have its lower end of equal diameter with the body of the pipe and that any suitable and preferred form of connection may be made between the supply and service pipes.

The principal feature of our invention is the manner in which the supply pipe is coupled to the shank 10, and a preferred form is shown in the drawings and will now be described.

The end of the pipe 13 which is to be coupled to the shank, is preferably formed with an inwardly extending flange 15 having an opening adapted to loosely receive the extension 11 of the shank, this construction providing an extended end face for the pipe positioned annularly with respect to the extension 11, the exterior of said end of the pipe 13 being screw threaded as at 13ª.

The shank and pipe 13 are connected together by means of a coupling member 18 having its threads preferably on two planes complemental to the threads of the shank and the pipe, said coupling member also having an internal shoulder disclosed in the present instance in the form of a flange 19 positioned intermediate the threaded portions, said flange having an opening also of substantially equal diameter with the outer diameter of the extension 11, the structure being such that said extension will pass loosely through the opening in the flange 19, said flange providing a face in direct opposition to the end face of the pipe 13, as shown in Fig. 2.

The space between the opposed faces of the flanges 15 and 19 is adapted to receive an elastic gasket 20 of suitable material. In the drawing the gasket is shown as of common form and material, such as rubber, a washer 21 being interposed between the gasket and the face of the flange 19, this construction provides for compressing the gasket onto the exterior of the extension 11 as the coupling member and pipe 13 are given their relative threading movements. It is to be understood, however, that the particular type of gasket employed may be varied as desired, and that the washer 21 may or may not be employed as may be found necessary, the essential being the provision of a gasket structure between the opposing faces formed in such manner and of such material as will provide for its being compressed onto the exterior of the extension by the opposing faces referred to, and for this purpose, it will be understood that the gasket may be of rubber, metal, or of composition.

As will be seen, the relative arrangement of parts just described is such as to provide for adjustment for variations in distance between the inlet end of the shank 10, and the outlet end of the service pipe 12, this adjustment being secured either by the relative threading movement of the member 18 and shank 10 or the member 18 and pipe 13, or both, the former being preferred, especially for adjustment to approximate position, after which the adjustment of the member 18 and pipe 13 will compress the gasket onto the extension 11 and thus provide an efficient liquid closure in advance of the threaded connections.

As will be readily understood, the extension 11 has a range of movement of considerable length within the coupling member 18 without withdrawing the smooth portion from the packing provided by the gasket, so that adjustments to increase or decrease the length of the supply pipe (represented by the pipe 13 and member 18) may be had to meet service conditions and at the same time retain the advantages resulting from the use of the gasket packing in advance of the threaded connection between the member 18 and shank 10. By this particular arrangement of parts the external threads of the supply pipe 13 need not be of as great a depth as those of the shank, thereby enabling the use of a supply pipe of medium wall thickness without restricting the liquid flow or providing a bulky appearance to the pipe. The threads of the member 18 may or may not be of the same pitch, the particular arrangement in this respect being optional to meet service conditions, the preference being, however, to decrease the depth of the threads on the supply pipe in order that the wall thickness thereof be not excessive, and that the external diameter be not materially reduced in order to eliminate a bulky appearance to the pipe, this alternative arrangement falling within the scope of the invention, the latter consisting in providing a screw threaded connection between the supply pipe and the shank in order to permit adjustments, and at the same time providing a packing in advance of the screw threaded connection so as to prevent liquid flow into the threads of the adjustable connection.

While we have herein disclosed a preferred form and modifications thereof, it is to be understood that changes and modifications therein required under the conditions of use may be employed and are contemplated by the invention herein so long as they fall within the spirit and scope of the invention as disclosed in the following claims.

Having thus described our invention, what we claim as new is:—

1. In combination, a faucet shank being exteriorly threaded and having an elongated and reduced extension provided with a smooth outer surface, a supply pipe engaging loosely over the reduced extension and having an inturned flange fitting snugly against the extension and further having exterior screw threads, a coupling member engaging at its ends in threaded relation over the faucet shank and the supply pipe respectively and having an inwardly extending flange midway of its ends snugly fitting about the extension, said flange on the coupling member providing a face in opposition to the face of the flange on the supply pipe, a gasket carried about the extension between said flanges, and a washer interposed between the gasket and the flange of the coupling member.

2. In combination, a supply pipe having exterior threads at one end and an internal flange at said end, a shank disposed in longitudinal alinement with the supply pipe and having a reduced extension engaging through the flange and into the supply pipe, said shank having external threads above the extension, a coupling member disposed in threaded engagement over the end of the supply pipe and having an internally threaded outer end engaging over the threaded shank, said coupling member further having an inwardly extending flange midway of its ends embracing the extension and lying in opposition to the flange of the supply pipe, and a gasket interposed between the flanges and adapted to bind against the extension by the pressure of the coupling member.

3. A coupling as specified comprising a threaded shank having a reduced smooth extension, a threaded supply pipe loose about the extension and having an inturned end flange embracing the extension, a gasket about the extension against the outer face of the flange, and a coupling member threaded on the supply pipe and the shank and having an intermediate flange loose about the extension for engagement against the gasket to bind the latter against the extension.

4. In combination, an externally threaded supply pipe, an externally threaded shank provided with a reduced smooth extension slidably engaging in the supply pipe, a packing surrounding the reduced extension, and a coupling member engaging in threaded relation at its opposite ends the shank and the supply pipe and having an interior flange bearing against the packing, the coupling member being adapted to be turned up on the supply pipe whereby said flange compresses the packing against the end of the supply pipe and against said reduced extension.

In testimony whereof we have hereunto set our hands in presence of two subscribing witnesses.

PHILIP MUELLER.
ANTON C. SCHUERMANN.

Witnesses:
   LEONARD F. MCKIBBEN,
   WILLIAM R. BIDDLE.